(12) United States Patent
Hendry et al.

(10) Patent No.: US 9,106,930 B2
(45) Date of Patent: Aug. 11, 2015

(54) VIDEO ENCODING METHOD, VIDEO DECODING METHOD, AND DEVICE USING SAME

(71) Applicant: LG Electronics Inc., Seoul (KR)

(72) Inventors: Hendry Hendry, Seoul (KR); Joonyoung Park, Seoul (KR); Yongjoon Jeon, Seoul (KR); Byeongmoon Jeon, Seoul (KR); Jungsun Kim, Seoul (KR); Jaehyun Lim, Seoul (KR); Chulkeun Kim, Seoul (KR); Naeri Park, Seoul (KR); Seungwook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/450,893

(22) Filed: Aug. 4, 2014

(65) Prior Publication Data
US 2014/0341306 A1 Nov. 20, 2014

Related U.S. Application Data

(63) Continuation of application No. PCT/KR2013/000847, filed on Feb. 1, 2013.

(60) Provisional application No. 61/596,669, filed on Feb. 8, 2012, provisional application No. 61/595,695, filed on Feb. 7, 2012, provisional application No. 61/595,029, filed on Feb. 4, 2012.

(51) Int. Cl.
*H04N 19/00* (2014.01)
*H04N 19/174* (2014.01)
*H04N 19/70* (2014.01)
*H04N 19/436* (2014.01)
*H04N 19/119* (2014.01)

(52) U.S. Cl.
CPC ............. *H04N 19/70* (2013.01); *H04N 19/119* (2013.01); *H04N 19/174* (2013.01); *H04N 19/436* (2013.01)

(58) Field of Classification Search
None
See application file for complete search history.

(56) References Cited

U.S. PATENT DOCUMENTS

| | | | |
|---|---|---|---|
| 2005/0169374 A1* | 8/2005 | Marpe et al. | 375/240.16 |
| 2009/0003446 A1* | 1/2009 | Wu et al. | 375/240.16 |
| 2010/0098155 A1* | 4/2010 | Demircin et al. | 375/240.02 |
| 2010/0177828 A1* | 7/2010 | Rubinstein et al. | 375/240.26 |
| 2010/0246679 A1* | 9/2010 | Dey et al. | 375/240.16 |
| 2011/0001643 A1* | 1/2011 | Sze et al. | 341/87 |
| 2012/0014431 A1* | 1/2012 | Zhao et al. | 375/240.02 |

FOREIGN PATENT DOCUMENTS

| | | |
|---|---|---|
| KR | 10-2009-0085628 | 8/2009 |
| KR | 10-2009-0116988 | 11/2009 |
| KR | 10-2010-0052945 | 5/2010 |
| KR | 10-2010-0130839 | 12/2010 |
| KR | 10-2011-0134626 | 12/2011 |

* cited by examiner

*Primary Examiner* — Jay Patel
*Assistant Examiner* — Reza Aghevli
(74) *Attorney, Agent, or Firm* — McKenna Long & Aldridge LLP

(57) ABSTRACT

The video encoding method comprises the steps of specifying a tile and a slice by partitioning an inputted picture; performing encoding on the basis of the tile and the slice, and transmitting the encoded video information. Here, the picture is partitioned into one or more tiles and one or more slices, and the restrictions for parallel processing can be applied to the tiles and the slices.

9 Claims, 25 Drawing Sheets

FIG. 3
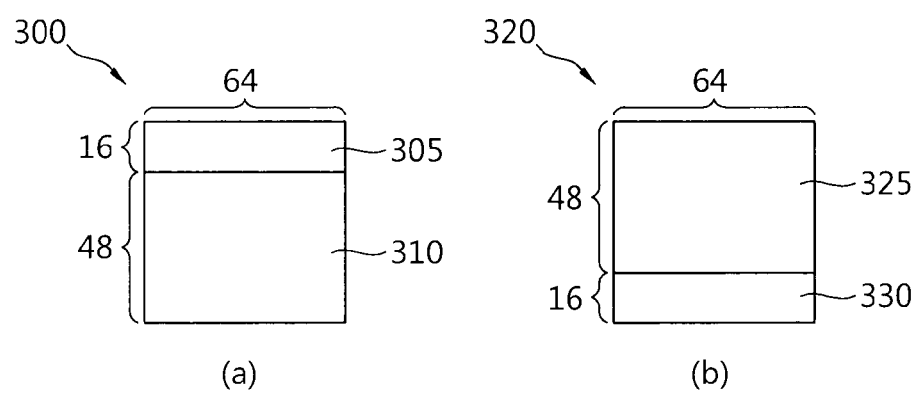
(a)   (b)
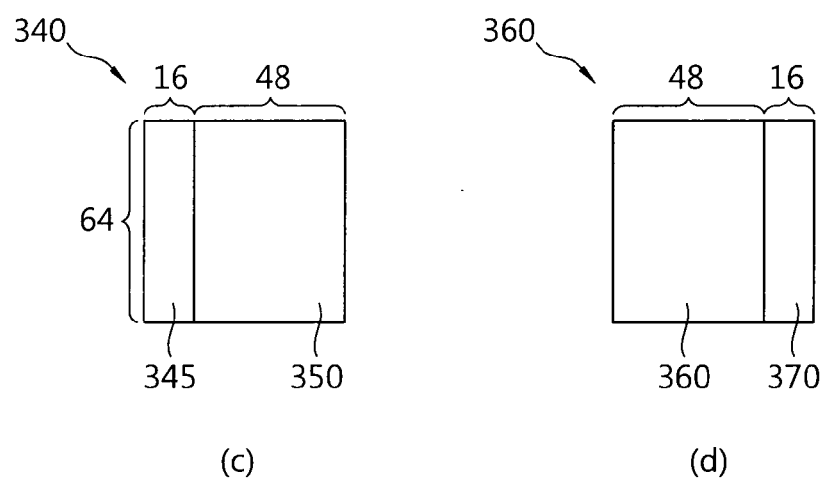
(c)   (d)

FIG. 10
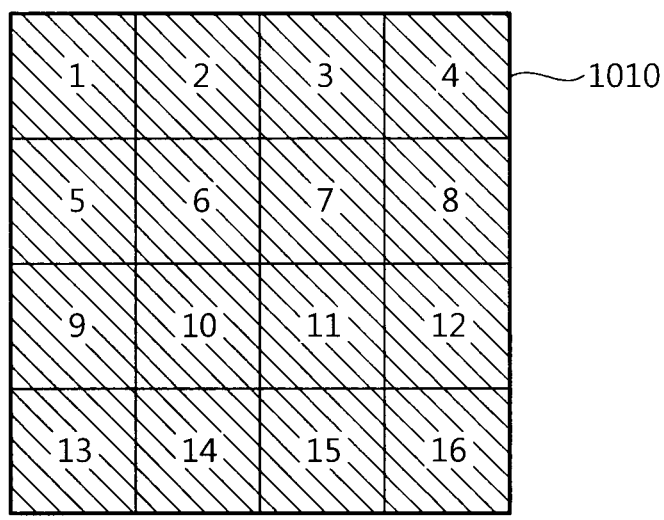

FIG. 12
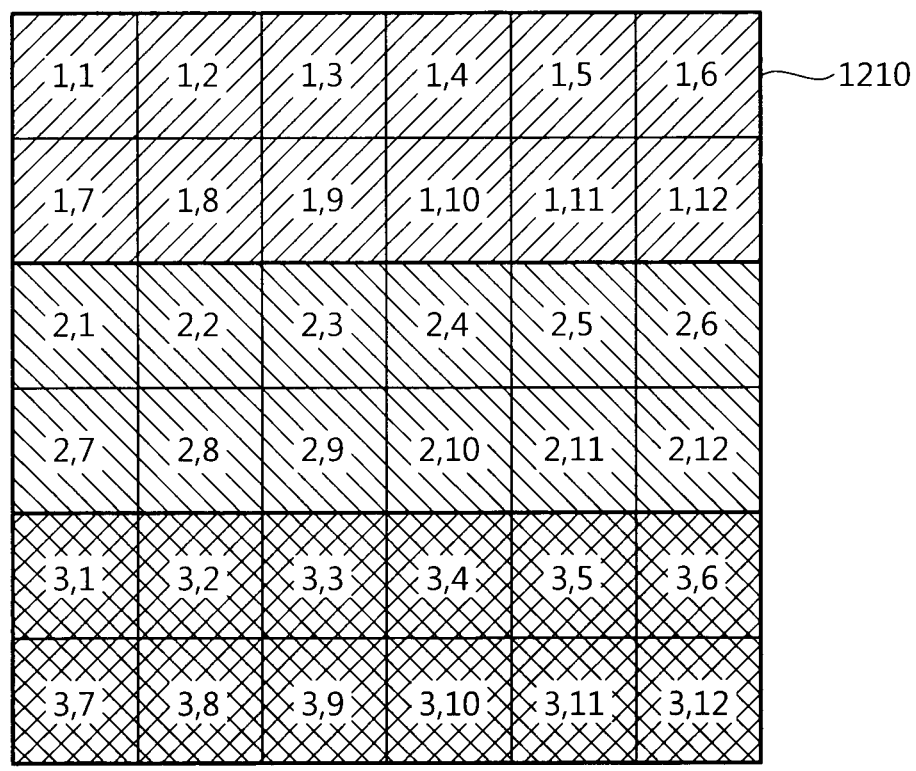
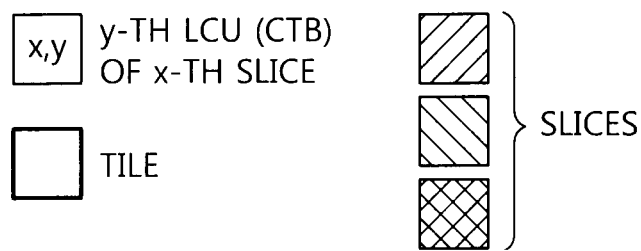

FIG. 13
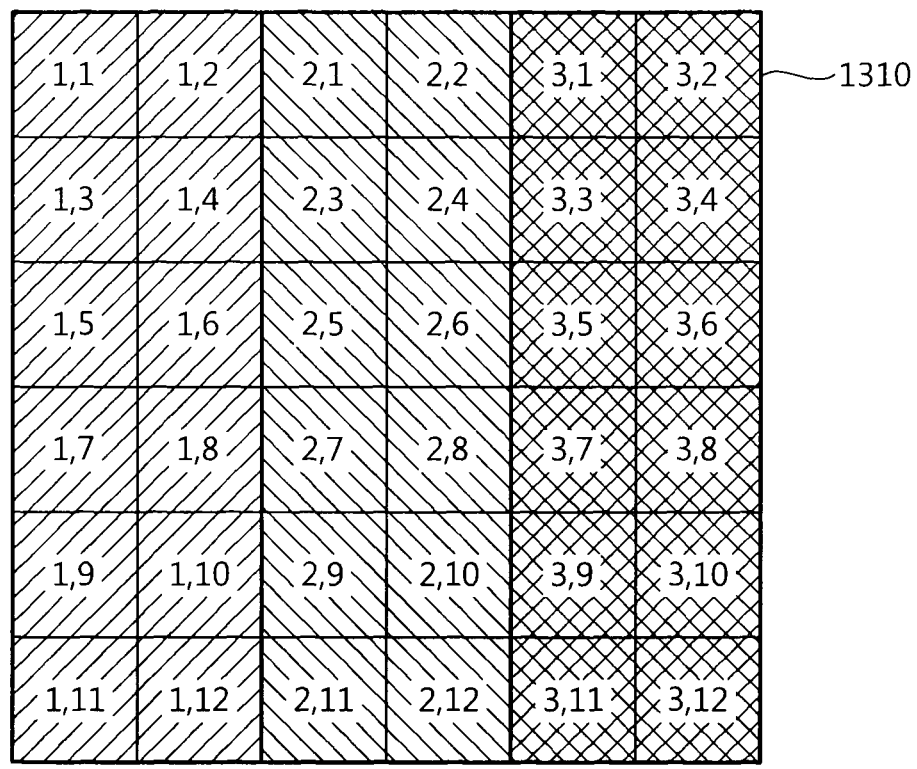
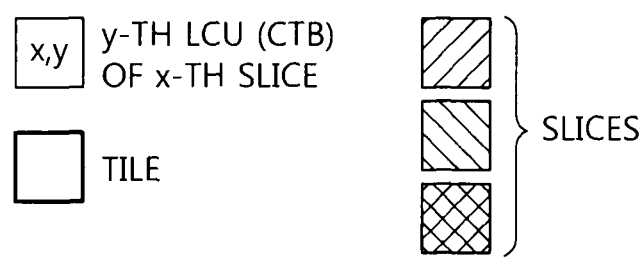

FIG. 14
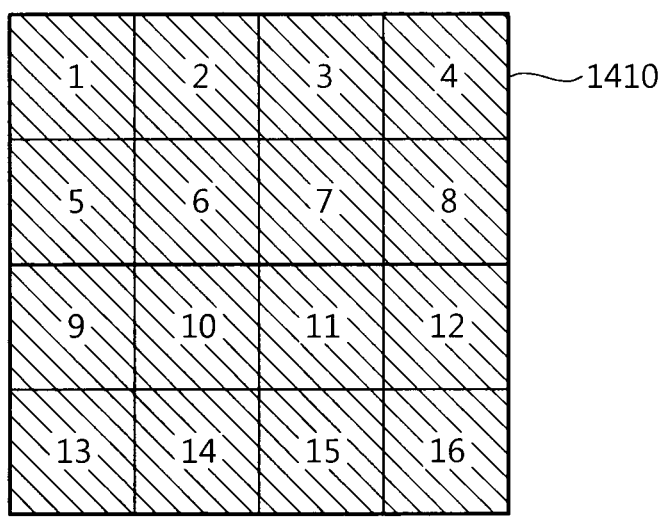
 x-TH LCU (CTB)
 TILE
 SLICE

FIG. 15
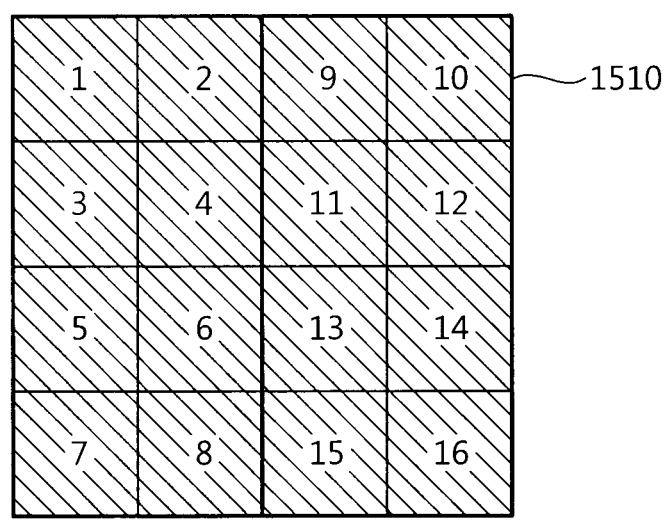

FIG. 16
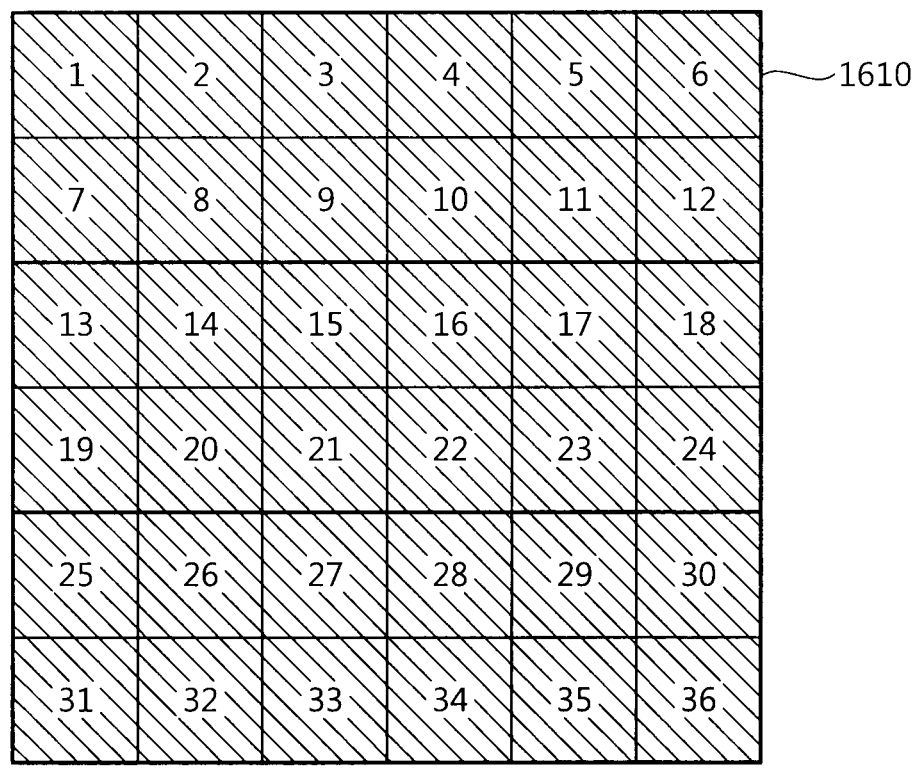
 x-TH LCU (CTB)    SLICE
 TILE

FIG. 21
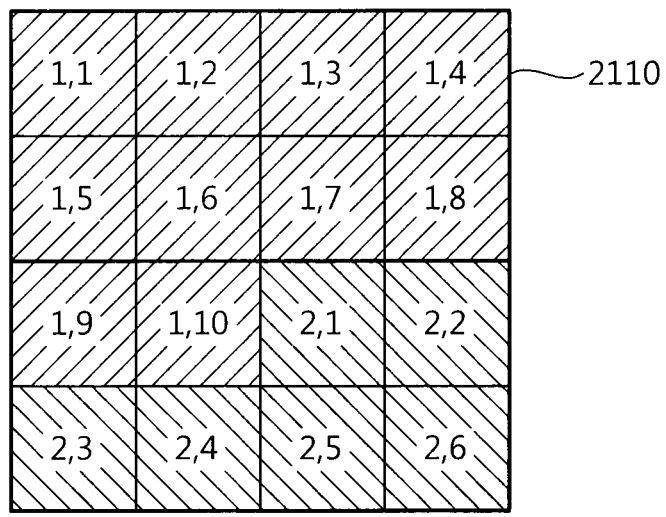
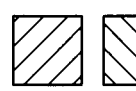

VIDEO ENCODING METHOD, VIDEO DECODING METHOD, AND DEVICE USING SAME

This application is a Continuation Bypass application of International Application No. PCT/KR2013/000847, filed Feb. 1, 2013, and claims the benefit of U.S. Application Nos. 61/595,029, filed on Feb. 4, 2012, 61/595,695, filed on Feb. 7, 2012, and 61/596,669, filed Feb. 8, 2012, all of which are hereby incorporated by reference in their entirety for all purposes as if fully set forth herein.

TECHNICAL FIELD

The present invention relates to a video compression technique, and more particularly, to a method of specifying a region of a picture.

BACKGROUND ART

Recently, demands for a high-resolution and high-quality image have increased in various fields of applications. As an image has higher resolution and higher quality, an amount of data on the image increases more.

Accordingly, when image data is transferred using media such as existing wired or wireless broadband lines or image data is stored in existing storage media, the information transfer cost and the information storage cost increase.

High-efficiency image compressing techniques can be used to effectively transfer, store, and reproduce information on high-resolution and high-quality images.

Inter prediction and intra prediction can be used to enhance image compression efficiency. In the inter prediction, pixel values of a current picture are predicted with reference to information of other pictures. In the intra prediction, pixel values of a current picture are predicted using an inter-pixel relationship in the same picture.

Various methods for making an image equal to an original image can be applied to a process unit, for example, a block, of a predicted picture. Accordingly, a decoder can decode an image more accurately (more closely to an original image), and an encoder can encode an image to reconstruct the image more accurately.

Therefore, it is necessary to study about how to define process units in a picture, for example, how to define a constraint on process units or a constraint on use of the process units.

SUMMARY OF THE INVENTION

Technical Problem

An object of the invention is to provide an appropriate constraint that can be imposed on encoding/decoding so as to enhance compression efficiency and to reduce complexity.

Another object of the invention is to provide a method and a device for indicating a constraint on use of non-square quad-tree transform (NSQT) and use of asymmetric motion partition (AMP).

Still another aspect of the invention is to provide a method and a device that can enhance compression efficiency and to reduce complexity by imposing an appropriate constraint on process units of a picture.

Still another aspect of the invention is to provide a method and a device that can smoothly perform parallel processing by setting a predetermined constraint on a relationship between slices and tiles in a picture.

Solution to Problem

According to an aspect of the invention, there is provided a video encoding method including the steps of: partitioning an input picture and specifying a tile and a slice; performing an encoding operation on the basis of the tile and the slice; and transmitting encoded video information, wherein the picture is partitioned into one or more tiles and one or more slices, and wherein a constraint for parallel processing is applied to the one or more tiles and the one or more slices.

According to another aspect of the invention, there is provided a video decoding method including the steps of: receiving video information; specifying a tile and a slice in a current picture on the basis of the received video information; and performing a decoding operation on the basis of the specified tile and the specified slice, wherein the current picture is partitioned into one or more tiles and one or more slices, and wherein a constraint for parallel processing is applied to the one or more tiles and the one or more slices.

Effects of the Invention

According to the invention, it is possible to enhance compression efficiency by imposing an appropriate constraint on encoding/decoding.

According to the invention, a video encoder may impose a constraint on use of the NSQT and use of the AMP and transmit an indicator thereof, and a video decoder may use the NSQT and the AMP in accordance with the indication of the indicator, thereby reducing complexity and enhancing compression efficiency.

According to the invention, it is possible to enhance compression efficiency and to reduce complexity by imposing an appropriate constraint on process units of a picture.

According to the invention, it is possible to smoothly perform parallel processing and to reduce complexity, by setting a predetermined constraint on a relationship between a slice and a tile in a picture.

BRIEF DESCRIPTION OF THE DRAWINGS

FIG. 3 is a diagram schematically illustrating an example of AMP.

FIGS. 10 to 20 are diagrams schematically illustrating examples of a tile and a slice according to the invention.

FIGS. 21 to 23 are diagrams schematically illustrating examples of a slice and a tile which are not permitted because constraints according to the invention are not satisfied.

DESCRIPTION OF EXEMPLARY EMBODIMENTS

Figure 1:
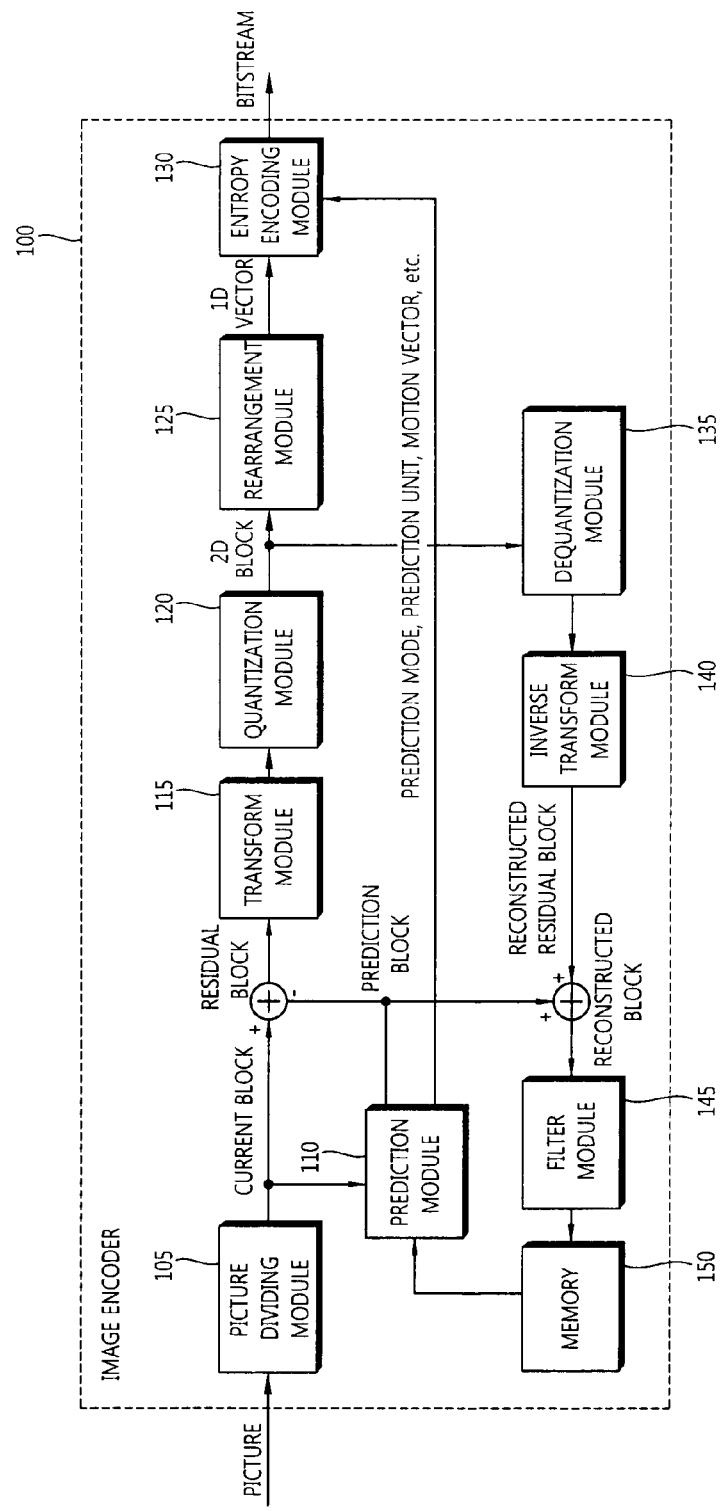
FIG. 1 is a block diagram schematically illustrating a video encoder according to an embodiment of the invention.

The present invention can be variously modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding apparatus and does not mean that the elements are embodied by independent hardware or independent software. For example, two or more elements of the elements may be combined to form a single element, or one element may be divided into plural elements. The embodiments in which the elements are combined and/or divided belong to the scope of the invention without departing from the concept of the invention.

Hereinafter, exemplary embodiments of the invention will be described in detail with reference to the accompanying drawings. Like constituents in the drawings will be referenced by like reference numerals and will not be repeatedly described.

FIG. 1 is a block diagram schematically illustrating a video encoder according to an embodiment of the invention. Referring to FIG. 1, a video encoder 100 includes a picture partitioning module 105, a prediction module 110, a transform module 115, a quantization module 120, a rearrangement module 125, an entropy encoding module 130, a dequantization module 135, an inverse transform module 140, a filter module 145, and a memory 150.

The picture partitioning module 105 may partition an input picture into at least one process unit block. Here, a block as the process unit may be a prediction unit (hereinafter, referred to as a "PU"), a transform unit (hereinafter, referred to as a "TU"), or a coding unit (hereinafter, referred to as a "CU").

The process unit blocks partitioned by the picture partitioning module 105 may have a quad-tree structure.

The prediction module 110 includes an inter prediction module that performs an inter prediction process and an intra prediction module that performs an intra prediction process, as will be described later. The prediction module 110 performs a prediction process on the processing units of a picture divided by the picture dividing module 105 to create a prediction block. In the prediction module 110, the processing unit of a picture may be a CU, a TU, or a PU. The prediction module 110 may determine whether the prediction performed on the corresponding processing unit is an inter prediction or an intra prediction, and may determine specific details (for example, a prediction mode) of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

In the inter prediction, a skip mode, a merge mode, an MVP (Motion Vector Prediction) mode, and the like may be used. In the inter prediction, a reference picture may be selected for a PU, and a reference block having the same size as the PU may be selected by integer pixel samples. Then, a prediction block in which a residual signal from the current PU is minimized and the motion vector magnitude is minimized is created.

The prediction block may be constructed in the unit of integer pixel samples or in the unit of pixel samples less than an integer pixel. Here, the motion vector may also be expressed in the unit of pixel samples less than an integer pixel.

Information such as an index, a motion vector (for example, a motion vector predictor), and a residual signal of a reference picture selected through the inter prediction is entropy-encoded and is transmitted to a decoder. When a skip mode is applied, a prediction block may be used as a reconstructed block and thus the residual signal may not be created, transformed, quantized, and transmitted at all.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

A PU may be a block having various sizes and shapes. For example, in case of inter prediction, a PU may be blocks having sizes such as 2N×2N, 2N×N, N×2N, and N×N (where N is an integer). In case of intra prediction, a PU may be blocks having sizes such as 2N×2N and N×N (where N is an integer). A PU with a size of N×N may be set to be applied to only a specific case. For example, the PU with a size of N×N may be set to be used for only a smallest CU or may be set to be used for only the intra prediction. In addition to the PUs with the above-mentioned sizes, PUs such as an N×mN block, an mN×N block, a 2N×mN block, and an mN×2N block (where m<1) may be additionally defined and used.

Residual values (a residual block or a residual signal) between the constructed prediction block and the original block are input to the transform module 115. The prediction mode information, the motion vector information, and the like used for the prediction are encoded along with the residual values by the entropy encoding module 130 and are transmitted to the decoder.

The transform module 115 performs a transform process on the residual block in the unit of TUs and creates transform coefficients.

A transform block is a rectangular block of samples and is a block to which the same transform is applied. The transform block may be a TU and may have a quad-tree structure.

The transform module 115 may perform a transform process depending on the prediction mode applied to a residual block and the size of the block.

For example, when intra prediction is applied to a residual block and the residual block has an 4×4 array, the residual block is transformed using discrete sine transform (DST). Otherwise, the residual block may be transformed using discrete cosine transform (DCT).

The transform module 115 may construct a transform block of transform coefficients through the transform.

The quantization module 120 may quantize the residual values, that is, transform coefficients, transformed by the transform module 115 and may create quantization coefficients. The values calculated by the quantization module 120 may be supplied to the dequantization module 135 and the rearrangement module 125.

The rearrangement module 125 may rearrange the transform coefficients supplied from the quantization module 120. By rearranging the quantization coefficients, it is possible to enhance the encoding efficiency in the entropy encoding module 130.

The rearrangement module 125 may rearrange the quantized transform coefficients in the form of a two-dimensional block to the form of a one-dimensional vector through the use of a coefficient scanning method.

The entropy encoding module 130 may perform an entropy encoding operation on the quantization coefficients rearranged by the rearrangement module 125. Examples of the entropy encoding method include an exponential Golomb method, a CAVLC (Context-Adaptive Variable Length Coding) method, and a CABAC (Context-Adaptive Binary Arithmetic Coding) method. The entropy encoding module 130 may encode a variety of information such as quantization coefficient information and block type information of a CU, prediction mode information, partition unit information, PU information, transfer unit information, motion vector information, reference picture information, block interpolation information, and filtering information transmitted from the rearrangement module 125 and the prediction module 110.

The entropy encoding module 130 may give a predetermined change to a parameter set or syntaxes to be transmitted, if necessary.

The dequantization module 135 dequantizes the values (transform coefficients) quantized by the quantization module 120. The inverse transform module 140 inversely transforms the values dequantized by the dequantization module 135.

The residual values created by the dequantization module 135 and the inverse transform module 140 may be merged with the predicted block predicted by the prediction module 110 to construct a reconstructed block.

In FIG. 1, a residual block and a prediction block are added to create a reconstructed block by an adder. At this time, the adder may be considered as a particular module (reconstructed block creating module) that creates a reconstructed block.

The filter module 145 applies a deblocking filter, an ALF (Adaptive Loop Filter), an SAO (Sample Adaptive Offset) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter module 145 may not perform a filtering operation on the reconstructed block used in the inter prediction.

The memory 150 may store the reconstructed block or picture calculated by the filter module 145. The reconstructed block or picture stored in the memory 150 may be supplied to the prediction module 110 that performs the inter prediction.

Figure 2:
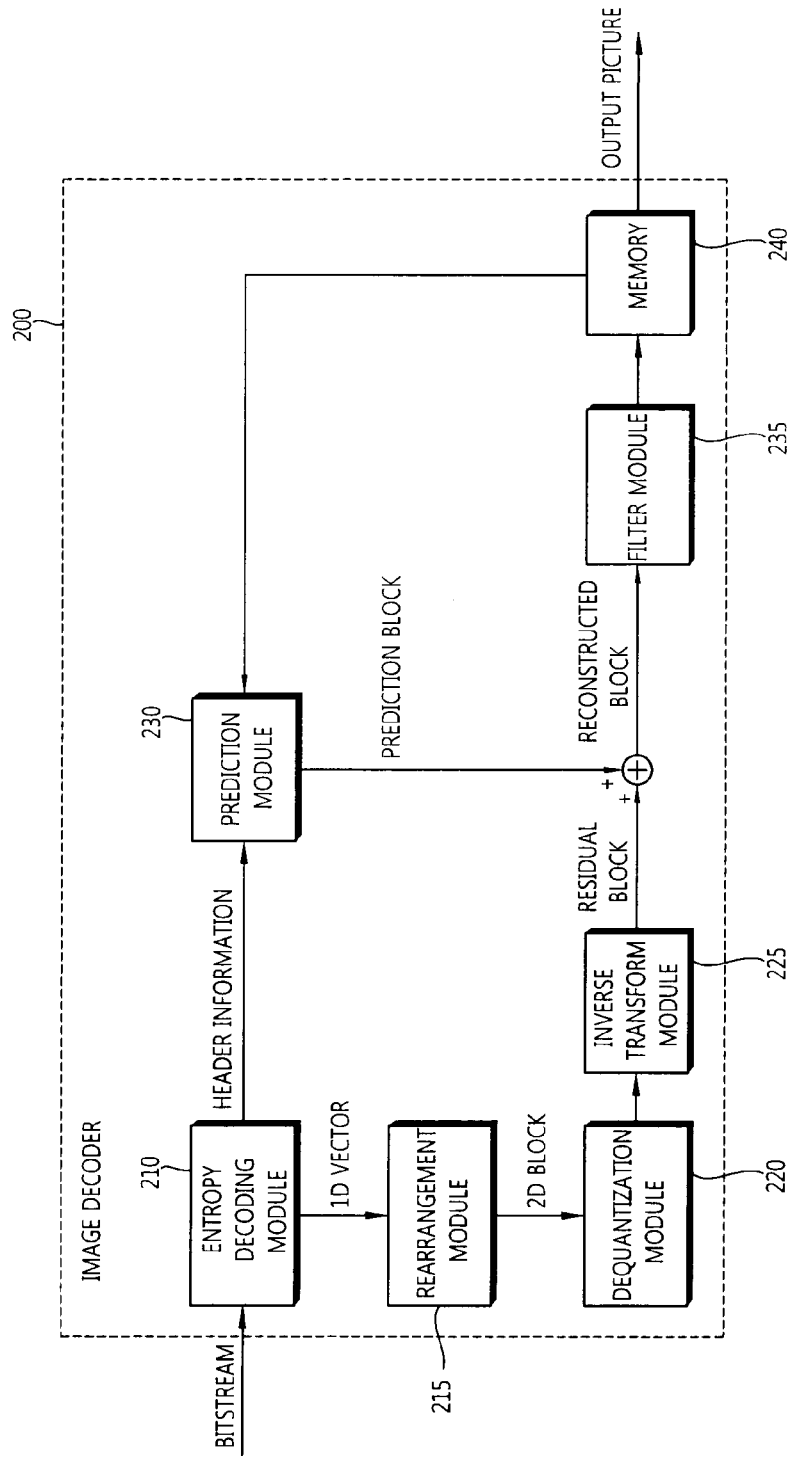
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoding module 210, a rearrangement module 215, a dequantization module 220, an inverse transform module 225, a prediction module 230, a filter module 235, and a memory 240.

When a video bitstream is input from the video encoder, the input bitstream may be decoded on the basis of the order in which video information is processed by the video encoder.

For example, when the video encoder uses a variable length coding (hereinafter, referred to as "VLC") method such as the CAVLC method to perform the entropy encoding operation, the entropy decoding module 210 may implement the same VLC table as the VLC table used in the video encoder and may perform the entropy decoding operation. When the video encoder uses the CABAC method to perform the entropy encoding process, the entropy decoding module 210 may perform the entropy decoding operation using the CABAC method to correspond thereto.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bitstream information, that is, the quantized transform coefficients, entropy-decoded by the entropy decoding module 210 on the basis of the rearrangement method in the video encoder.

The rearrangement module 215 may reconstruct and rearrange the coefficients expressed in the form of a one-dimensional vector into coefficients in the form of a two-dimensional block. The rearrangement module 215 may scan the coefficients on the basis of the prediction mode applied to the current block (transform block) and the size of the transform block and may create an array of coefficients (quantized transform coefficients) in the form of a two-dimensional block.

The dequantization module 220 may perform dequantization on the basis of the quantization parameters supplied from the video encoder and the coefficient values of the rearranged block.

The inverse transform module 225 may perform the inverse DCT and/or inverse DST of the DCT and/or DST, which has been performed by the transform module of the video encoder, on the quantization result from the video encoder. The inverse transform may be performed on the basis of a transfer unit or a partition unit of a picture determined by the video encoder. The transform module of the video encoder may selectively perform the DCT and/or DST depending on plural information pieces such as the prediction method, the size of a current block, and the prediction direction, and the inverse transform module 225 of the video decoder may perform the inverse transform on the basis of the transform information on the transform performed by the transform module of the video encoder.

The prediction module 230 may construct a predicted block on the basis of prediction block construction information supplied from the entropy decoding module 210 and the previously-decoded block and/or picture information supplied from the memory 240.

When the prediction mode of a current CU and/or PU is an intra prediction mode, the prediction module 230 may perform an intra prediction operation of constructing a predicted block on the basis of pixel information of a current picture.

When the prediction mode for a current PU is the inter prediction mode, the prediction module 230 may perform the inter prediction operation on the current PU on the basis of information included in at least one of a previous picture and a subsequent picture of the current picture. At this time, motion information for the inter prediction of the current PU, for example, information on motion vectors and reference picture indices, supplied from the video encoder may be induced from a skip flag, a merge flag, and the like received from the video encoder.

The reconstructed block may be constructed using the predicted block constructed by the prediction module 230 and the residual block supplied from the inverse transform module 225. FIG. 2 illustrates that the residual block and the predicted block are added by an adder to construct a reconstructed block. Here, the adder may be considered as a particular module (reconstructed block constructing module) that constructs a reconstructed block.

When the skip mode is used, the residual signal may not be transmitted and the predicted block may be used as a reconstructed block.

The reconstructed block and/or picture may be supplied to the filter module 235. The filter module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

On the other hand, in order to effectively perform encoding and decoding and to enhance coding efficiency, predetermined constraints may be imposed on the encoding process and the decoding process.

For example, constraints on asymmetric motion partition (hereinafter, referred to as "AMP") and/or non-square quad-tree transform (hereinafter, referred to as "NSQT") and constraints on slices and tiles may be imposed. The video encoder may signal information indicating whether to impose the constraints to the video decoder.

When the AMP is used, the inter prediction may be performed in the unit of a rectangular prediction block (prediction unit). Therefore, the prediction block may be partitioned from a coding block in the form of asymmetric rectangles. For example, a coding block with a size of 2N×2N (where N is the number of pixels) may be partitioned into blocks with a size of 2N×3N/2 and blocks with a size of 2N×N/4 or may be partitioned into blocks with a size of 3/2N×2N and blocks with a size of N/4×2N, instead of being partitioned into symmetric blocks such as four blocks with a size of N×N, three blocks with a size of 2N×N, or two blocks with a size of N×2N.

FIG. 3 is a diagram schematically illustrating an example of the AMP. FIG. 3 illustrates examples of the AMP for a coding block (coding unit) with a size of 64×64 pixels.

Examples of prediction blocks into which the coding block with a size of 64×64 pixels is partitioned in the asymmetric forms can be seen from FIG. 3.

In the example illustrated in FIG. 3(a), a coding block 300 with a size of 64×64 pixels may be partitioned into a prediction block 305 with a size of 64×16 pixels and a prediction block 310 with a size of 64×48 pixels. In the example illustrated in FIG. 3(b), a coding block 320 with a size of 64×64 pixels may be partitioned into a prediction block 325 with a size of 64×48 pixels and a prediction block 330 with a size of 64×16 pixels. In the example illustrated in FIG. 3(c), a coding block 340 with a size of 64×64 pixels may be partitioned into a prediction block 345 with a size of 16×64 pixels and a prediction block 350 with a size of 48×64 pixels. In the example illustrated in FIG. 3(d), a coding block 360 with a size of 64×64 pixels may be partitioned into a prediction block 365 with a size of 48×64 pixels and a prediction block 370 with a size of 16×64 pixels.

When the NSQT is used, residual values may be transformed in the unit of non-square transform blocks (transform units). In this case, when the transform block has a quad-tree structure, the transform may be performed as follows. That is, the transform may be performed in the unit of square transform blocks when the transform is performed at the highest level, and the transform may be performed in the unti of non-square transform blocks when the transform is performed at the second highest level. The NSQT may be used when the prediction block is an asymmetric partition.

Figure 4:
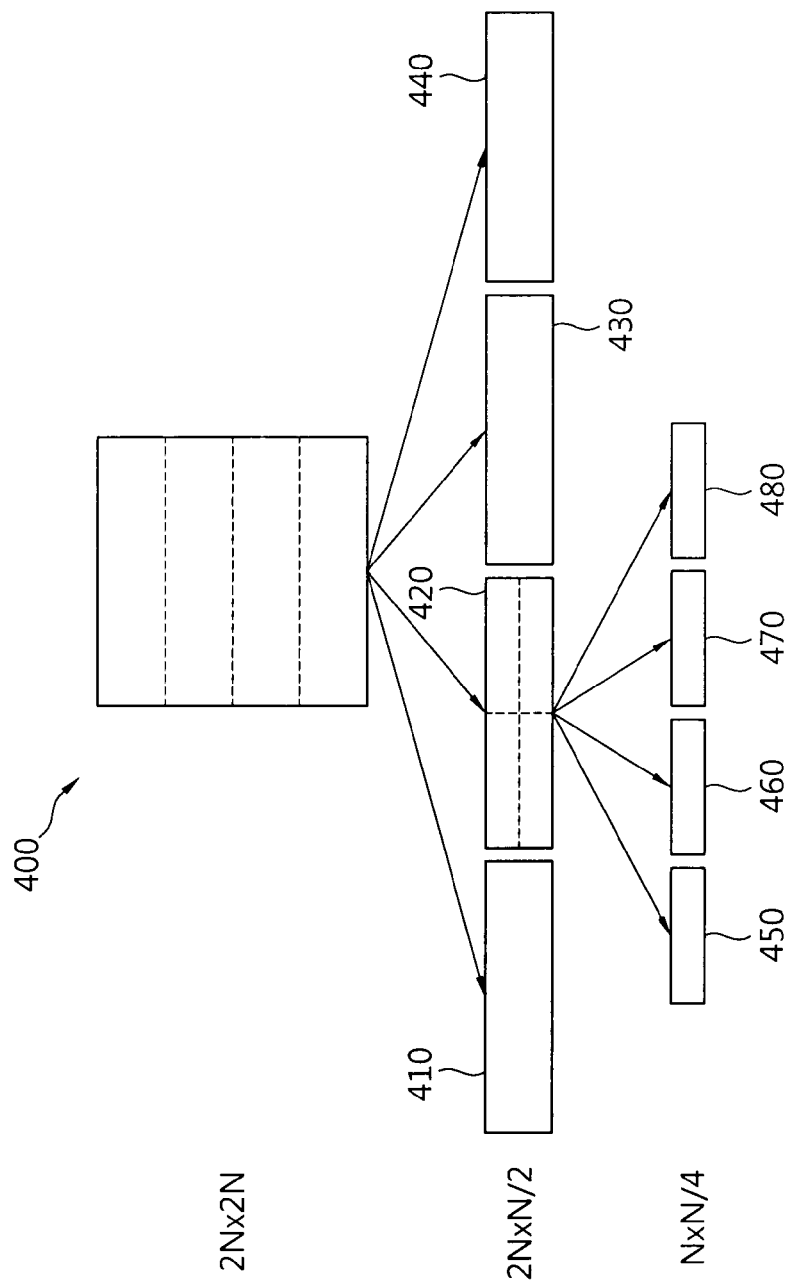
FIG. 4 is a diagram schematically illustrating an example of a non-square block used in NSQT.

FIG. 4 is a diagram schematically illustrating an example of a non-square block used in the NSQT.

In the example illustrated in FIG. 4, a coding block 400 with a size of 2N×2N may be partitioned into transform blocks in a quad-tree structure. When prediction blocks are blocks in the horizontal direction such as 2N×N, 2N×nU, and 2N×nD, the coding block 400 may be partitioned into non-square transform blocks in the horizontal direction illustrated in the drawing.

In the example illustrated in FIG. 4, the coding block 400 is partitioned non-square transform blocks 410, 420, 430, and 440 with a size of 2N×N/2 pixels. The transform blocks may be additionally partitioned depending on the quad-tree structure. Accordingly, for example, when the block 420 is additionally partitioned for transform, the block may be partitioned into non-square transform blocks 450, 460, 470, and 480 with a size of N×N/4.

Figure 5:
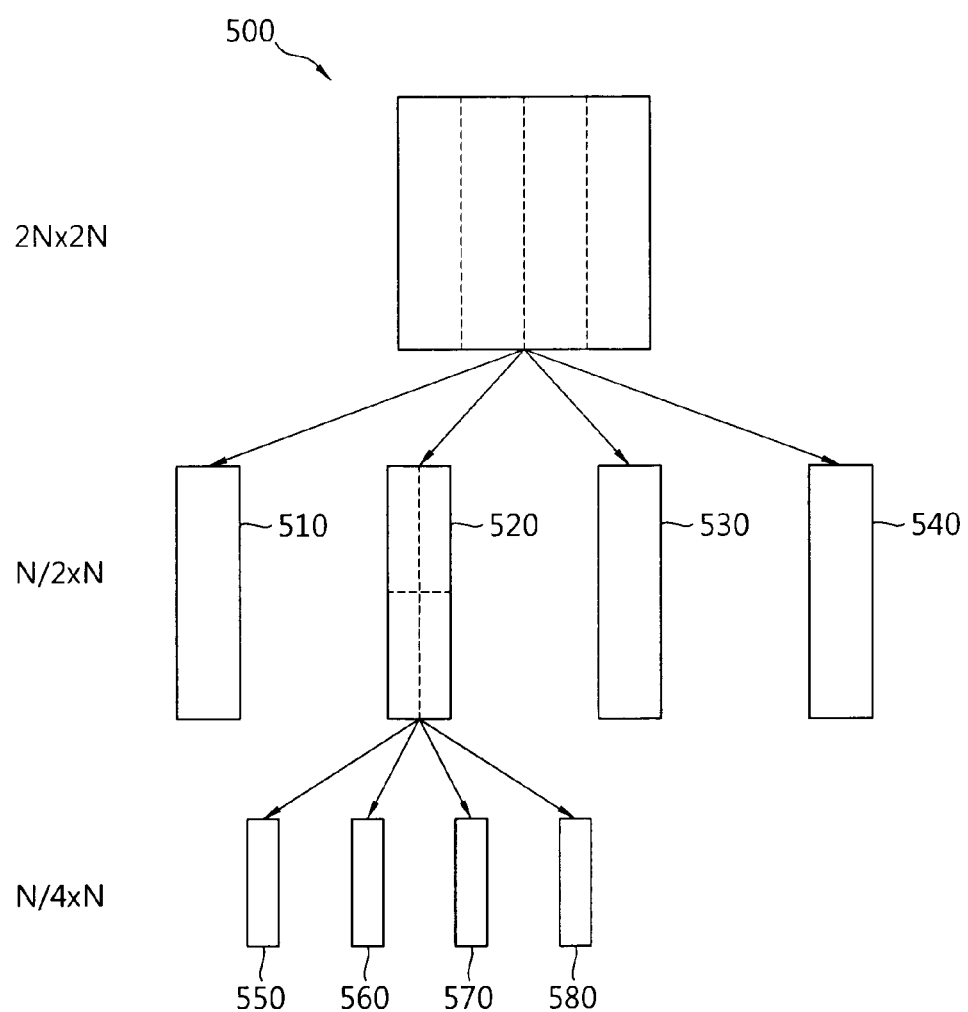
FIG. 5 is a diagram schematically illustrating another example of a non-square block used in the NSQT.

FIG. 5 is a diagram schematically illustrating another example of a non-square block used in the NSQT.

In the example illustrated in FIG. 5, a coding block 500 with a size of 2N×2N may be partitioned into transform blocks in a quad-tree structure. When prediction blocks are blocks in the vertical direction such as N×2N, nL×2N, and nR×2N, the coding block 500 may be partitioned into non-square transform blocks in the vertical direction illustrated in the drawing.

In the example illustrated in FIG. 5, the coding block 500 is partitioned non-square transform blocks 510, 520, 530, and 540 with a size of N/2×2N pixels. The transform blocks may be additionally partitioned depending on the quad-tree structure. Accordingly, for example, when the block 520 is additionally partitioned for transform, the block may be partitioned into non-square transform blocks 550, 560, 570, and 580 with a size of N/4×N.

As described above, constraints may be imposed on use of the AMP and the NSQT. In other words, the AMP and the NSQT may or may not be used as needed.

For example, the NSQT and the AMP may or may not be used depending on technical fields, product specifications, service fields to which the video encoding/decoding is applied.

Therefore, the video encoder may signal information indicating whether use the AMP or the NSQT to the video decoder.

Table 1 shows an example of parameter syntaxes for signaling information indicating whether to use the AMP or the NSQT.

TABLE 1

| seq_parameter_set_rbsp( ) { | Descriptor |
|---|---|
| profile_idc | u(8) |
| ... | |
| loop_filter_across_slice_flag | u(1) |
| sample_adaptive_offset_enabled_flag | u(1) |
| adaptive_loop_filter_enabled_flag | u(1) |
| asymmetric_motion_partition_enable_flag | u(1) |
| non_square_quadtree_transform_enable_flag | u(1) |
| ... | |
| } | |

Referring to Table 2, profile_idc is transmitted as the information indicating classifications of available techniques depending on technical fields, product specifications, service fields to which the video encoding/decoding is applied.

In the inter prediction, asymmetric_motion_partition_enable_flag as a flag indicating whether to use the AMP and non_square_quadtree_transform_enable_flag as a flag indicating whether to the NSQT are signaled through the use of a sequence parameter set.

When the value of non_square_quadtree_transform_enable_flag is 0, it indicates that the NSQT is not used. Therefore, in this case, the scanning/rearranging method for non-square transform blocks described above is not used.

When the value of non_square_quadtree_transform_enable_flag is 1, it indicates that the NSQT is used. Therefore, in this case, the scanning/rearranging method for non-square transform blocks described above may be used.

On the other hand, whether to use the NSQT may depend on profiles.

When the value of asymmetric_motion_partition_enable_flag is 0 (in the inter prediction), the AMP is not used. When the value of asymmetric_motion_partition_enable_flag is 0, part_mode may have values greater than 3, which are values corresponding to the AMP. When the value of asymmetric_motion_partition_enable_flag is 1, the AMP may be used.

Table 2 shows a relationship between a partition type and a prediction mode.

TABLE 2

| PredMode | part_mode | IntraSplitFlag | PartMode |
|---|---|---|---|
| MODE_INTRA | 0 | 0 | PART_2Nx2N |
| | 1 | 1 | PART_NxN |
| MODE_INTER | 0 | 0 | PART_2Nx2N |
| | 1 | 0 | PART_2NxN |
| | 2 | 0 | PART_Nx2N |
| | 3 | 0 | PART_NxN |
| | 4 | 0 | PART_2NxnU |
| | 5 | 0 | PART_2NxnD |
| | 6 | 0 | PART_nLx2N |
| | 7 | 0 | PART_nRx2N |

As can be seen from Table 2, the values of part_mode greater than 3 correspond to a partition with a size of 2NxnU, a partition with a size of 2NxnD, a partition with a size of nLx2N, and a partition with a size of nRx2N which are the asymmetric partitions (AMP).

The partition with a size of 2NxnU is a partition obtained by partitioning a square block in an asymmetric form so as to create a reactangular block narrow in the horizontal direction on the upper side. The partition with a size of 2NxnD is a partition obtained by partitioning a square block in an asymmetric form so as to create a reactangular block narrow in the horizontal direction on the lower side. The partition with a size of nLx2N is a partition obtained by partitioning a square block in an asymmetric form so as to create a reactangular block narrow in the vertical direction on the left side. The partition with a size of nRx2N is a partition obtained by partitioning a square block in an asymmetric form so as to create a reactangular block narrow in the vertical direction on the right side.

As described above, when the value of asymmetric_motion_partition_enable_flag is 0, the partition with a size of 2NxnU, the partition with a size of 2NxnD, the partition with a size of nLx2N, and the partition with a size of nRx2N are not used.

In Table 1, asymmetric_motion_partition_enable_flag which is the flag indicating whether to use the AMP and non_square_quadtree_transform_enable_flag which is the flag indicating whether to use the NSQT are signaled through the use of a sequence parameter set (SPS) in the inter prediction, but the invention is not limited to this example. For example, asymmetric_motion_partition_enable_flag and/or non_square_quadtree_transform_enable_flag may be signaled through the use of a picture parameter set (PPS) or an adaption parameter set (APS).

On the other hand, in order to enhance the coding efficiency, predetermined constraints may be imposed on the slice and the tile as described above.

The video encoder and the video decoder may partition a picture into predetermined units and may process (encode/decode) the partitioned units. For example, a picture may be partitioned into slices and tiles.

A slice is a sequence of one or more slice segments. A slice sequence begins with an independent slice segment. When dependent slice segments prior to the next independent slice segment in the same accessed unit are present, the slice includes the independent slice segment with which the slice sequence begins and the dependent slice segments prior to the next independent slice segment.

A slice segment may be a sequence of coding tree units (CTU) or coding tree blocks (CTB) that are consecutively ordered in a tile scan and that are included in a single network abstraction layer (NAL) unit. The coding tree unit may be a coding unit with a quad-tree structure and may be a largest coding unit (LCU). In this description, for the purpose of easy understanding of the invention, the coding tree unit and the largest coding unit may be mixed if necessary.

In a slice segment, a part including data elements of the first coding tree block (coding tree unit) or all the coding tree blocks (coding tree units) of the slice segment is referred to as a slice segment head. Here, the slice segment head of the independent slice segment is referred to as a slice header.

A slice may be a transmission unit of an NAL unit. For example, the NAL unit may include slices or slice segments.

Figure 6:
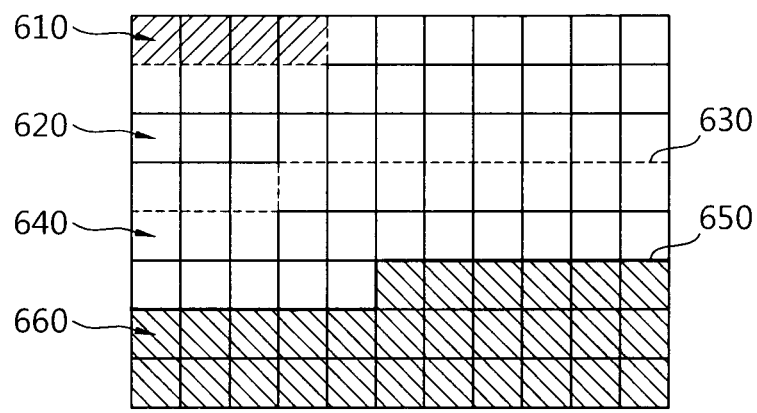
FIG. 6 is a diagram schematically illustrating an example of a slice.

FIG. 6 is a diagram schematically illustrating an example of a slice.

A current picture may be partitioned into multiple slices by slice boundaries. FIG. 6 illustrates an example where a current picture 600 is partitioned into two slices by a slice boundary 650.

A slice includes slice segments including coding tree units. The slice segments included in the slice may include an independent slice segment and may also include dependent slice segments when the dependent slice segments are present.

In FIG. 6, the first slice includes an independent slice segment 610 including four coding tree units and a second dependent slice segment 620 including 32 coding tree units and a second dependent slice segment 640 including 24 coding tree units before and after a slice segment boundary 630. In FIG. 6, one independent slice segment 660 includes 28 coding tree units.

A tile may be a sequence of coding tree units, coding tree blocks, or largest coding units. The coding tree unit may be a coding unit with a quad-tree structure and may be a largest coding unit (LCU). As described above, in this description, the coding tree unit and the largest coding unit may be mixed if necessary for the purpose of easy understanding of the invention.

Specifically, a tile may include a natural number of coding tree blocks or largest coding units that co-occurs in a region defined by one row and one column. Here, the coding tree blocks are consecutively ordered in a coding tree block scan order, for example, in a raster scan order.

A tile may be a scan unit in a picture. Accordingly, the tiles may be consecutively ordered in a picture scan order, for example, in a raster scan order, in the picture.

Both or one of two following conditions is established for the slices and the tiles. (1) All coding tree units or largest coding units in a slice belong to the same tile. (2) All coding tree units or largest coding units in a tile belong to the same slice.

Accordingly, a slice including multiple tiles and a tile including multiple slices may be present in the same picture.

Both or one of two following conditions is established for the slice segments and the tiles. (1) All coding tree units or largest coding units in a slice segment belong to the same tile. (2) All coding tree units or largest coding units in a tile belong to the same slice segment.

Figure 7:
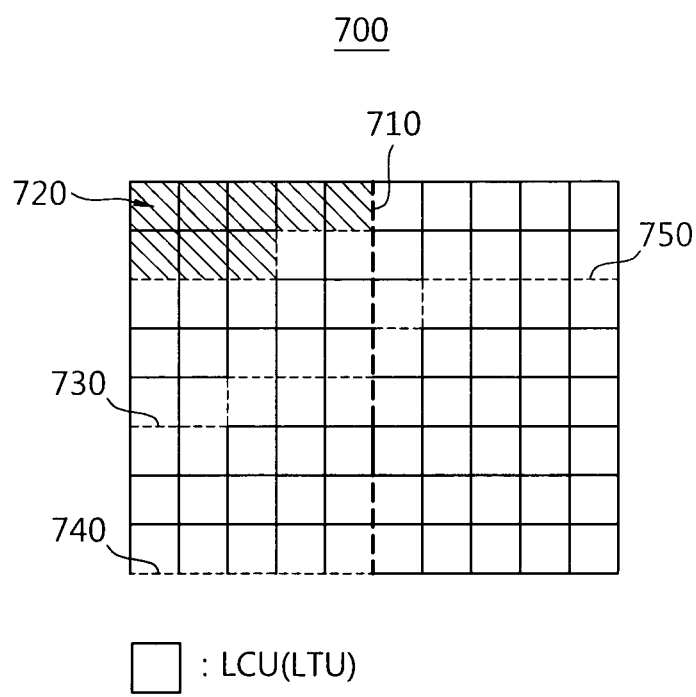
FIG. 7 is a diagram illustrating an example of a tile and a slice.

FIG. 7 is a diagram schematically illustrating an example of a tile and a slice.

A tile in a picture may be partitioned into multiple tiles by a tile boundary. In FIG. 7, a current picture 700 includes only one slice and is partitioned into two tiles on the right and left sides by a tile boundary 710.

A tile and a slice may be present together. In FIG. 7, the slice of the current picture 700 includes an independent slice segment 720 and four dependent slice segments partitioned by slice segment boundaries 730, 740, and 750.

Figure 8:
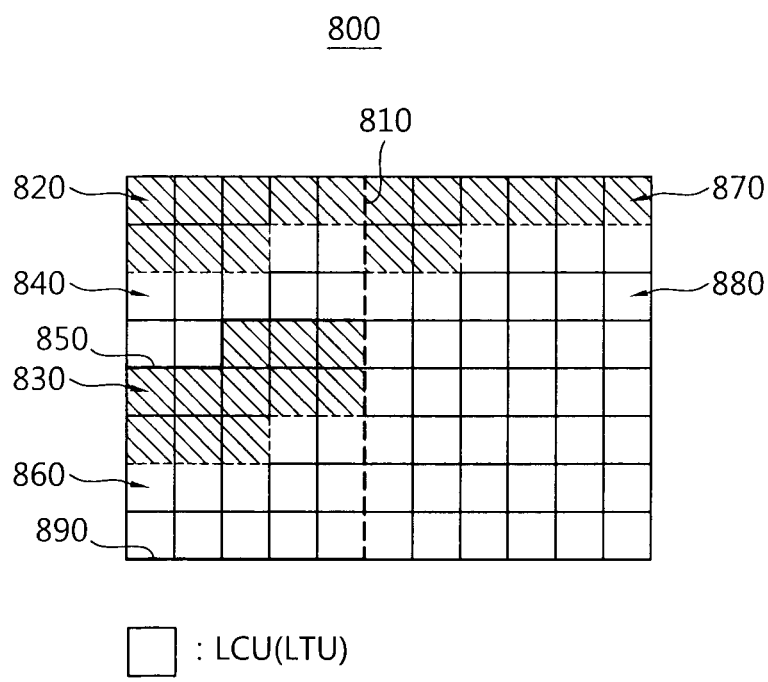
FIG. 8 is a diagram illustrating another example of a tile and a slice.

FIG. 8 is a diagram schematically illustrating another example of a tile and a slice.

In FIG. 8, a current picture 800 is partitioned into two tiles on the right and left sides by a tile boundary 810.

In the example illustrated in FIG. 8, the left tile of the tile boundary 810 includes two slices partitioned by a slice boundary 850.

As described above, a slice may include an independent slice and may also include a dependent slice when the dependent slice is present. In FIG. 8, the upper slice of the slice boundary 850 includes an independent slice segment 820 and a dependent slice segment 840, and the lower slice of the slice boundary 850 includes an independent slice segment 830 and a dependent slice segment 860. In the example illustrated in FIG. 8, a slice next to a slice boundary 890, that is, the slice in the second tile, includes an independent slice segment 870 and a dependent slice segment 880.

A tile and a slice may be independent decoding process units. For example, when parallel decoding is performed, the tiles may be decoded by a single processing core and the slices may be decoded by a single processing core.

In this regard, as can be seen from FIGS. 7 and 8, a slice and a tile may be a sequence of consecutive coding tree blocks (coding tree units), but the tile may have a specific shape. For example, in consideration of columns that are partitioned by vertical boundaries in a picture and that include coding tree blocks and rows that are partitioned by horizontal boundaries in a picture and that include coding tree blocks, a tile may include a natural number of coding blocks present in one row and one column. Therefore, a tile may be a rectangular region, unlike the slice.

In this way, a decoding process is differently performed between a slice and a tile.

For example, in case of a slice, each slice segment includes a slice segment header including data elements. As described above, a slice segment header of an independent slice segment is referred to as a slice header.

On the contrary, in a tile, a slice header is not present.

Therefore, in case of tiles, inter-tile dependency does not occur in a break caused by row or column boundaries of the coding tree blocks. On the contrary, in case of slices, dependency at the time of decoding may cause a problem in row or column boundaries of the coding tree blocks. In other words, when a slice is processed in parallel with a row or a column as a boundary, it may be difficult to decode a part not including information of a slice header.

Therefore, as described above, predetermined constraints on tiles and slices may be necessary.

Relationships or constraints between tiles and slices will be specifically described below with reference to the accompanying drawings.

A strict constraint is not imposed on the relationship between a current slice and a current tile. The relationship between the current slice and the current tile based on the premise that one or more tiles may be present in a slice and one or more slices may be present in a tile may be expressed by a loose relationship.

This loose relationship may give flexibility to design of a decoding process, but may cause (1) a problem that a degree of parallel processing is constrained and (2) a problem that computation complexity increases.

Figure 9:
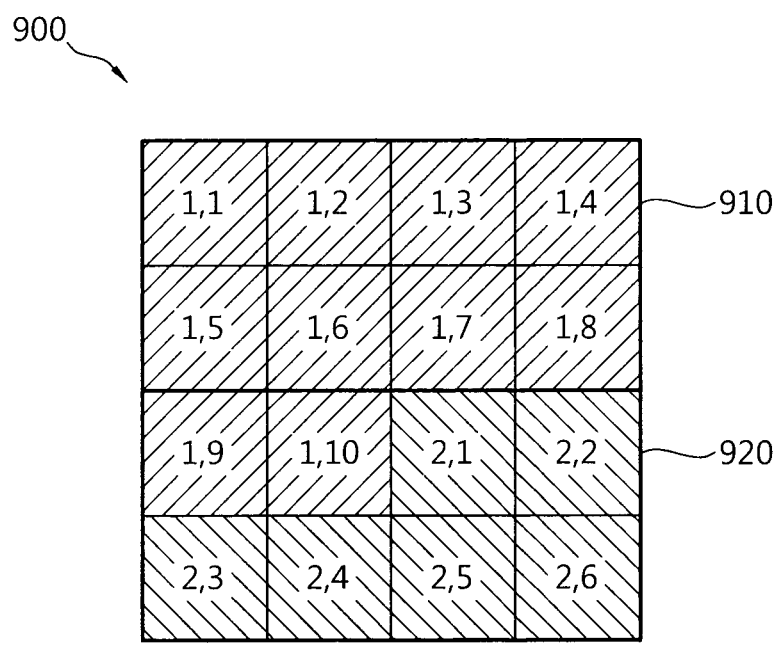
FIG. 9 is a diagram schematically illustrating an example where a problem occurs in parallel processing.

FIG. 9 is a diagram schematically illustrating an example where a problem may occur in parallel processing.

It is assumed that the video encoder partitions a picture as illustrated in FIG. 9. Referring to FIG. 9, a region 900 of the picture includes tile 1 910 and tile 2 920. The region 900 in the picture includes two slices. The region 900 in the picture may be a partial region in the picture or the entire region in the picture.

The first slice includes 10 coding tree blocks (1, 1) to (1, 10) and the second slice includes 6 coding tree blocks (2, 1) to (2, 6).

It is assumed that processing core 1 and processing core 2 which are main bodies of the decoding process, process different tiles in parallel. For example, in the example illustrated in FIG. 9, processing core 1 processes tile 1 910 and processing core 2 processes tile 2 920. One problem which may occur in FIG. 9 is that processing core 2 cannot perform a decoding process.

This is because the first LCU (coding tree block) of tile 2 920 is not a start portion of the slice and thus does not include information of the slice header. Accordingly, in the example illustrated in FIG. 9, the processing core has difficulty in performing a decoding process using the information of the slice header.

In the example illustrated in FIG. 9, when the tiles are independent and LCU (1, 9) and LCU (1, 10) are decoded, another problem may occur. For example, when independent tiles are used, intra prediction is not permitted at the tile boundary and thus LCU (1, 9) and LCU (1, 10) cannot refer to LCU (1, 5) and LCU (1, 6). However, since LCU (1, 9), LCU (1, 10), LCU (1, 5), and LCU (1, 6) are included in the same slice and there is no constraint applicable to reference pixels in the slice of the example illustrated in FIG. 9 in the intra prediction, a confusion may occur in the decoding process.

Therefore, in order to reduce confusions and complexity that may occur in the parallel process, the following constraints may be imposed.

In a picture, a tile cannot traverse a slice boundary and a slice cannot traverse a tile boundary. In other words, a natural number of tiles has to be present in a slice when the slice includes tiles, and a natural number of slices has to be present in a tile when the tile includes slices.

Specifically, (1) A picture may be partitioned into one or more slices and/or one or more tiles.

(2) When a tile includes slices, a natural number of complete slices has to be present in the tile.

(3) When a slice includes tiles, a natural number of complete tiles has to be present in the slice.

Here, a complete tile is one tile and means the entire region of a tile not partitioned into parts. A complete slice is one slice and means the entire region of a slice not partitioned into parts.

An allowable case and a non-allowable case based on constraints on the relationship between tiles and slices according to the invention will be described below with reference to the accompanying drawings.

The constraints on the relationship between tiles and slices are as follows: (1) a picture may include one or more tiles and/or one or more slices; (2) a tile may include a natural number of complete slices when the tile includes slices; and (3) a slice may include a natural number of complete tiles when the slice includes tiles.

Even when a picture is not partitioned into two or more slices or two or more tiles, the constraints according to the invention may be satisfied.

FIG. 10 is a diagram schematically illustrating an example of tiles and slices according to the invention. In the example illustrated in FIG. 10, a picture 1010 has a size 4×4 LCUs (coding tree blocks).

Referring to FIG. 10, the picture 1010 is not partitioned and includes one slice and one tile. It may be said that one tile is present in one slice and one slice is present in one tile. Therefore, the example illustrated in FIG. 10 does not violate the constraints according to the invention and thus is allowable.

When a picture is partitioned into two or more slices, the constraints according to the invention can be satisfied by causing one slice to belong to only one tile.

Figure 11:
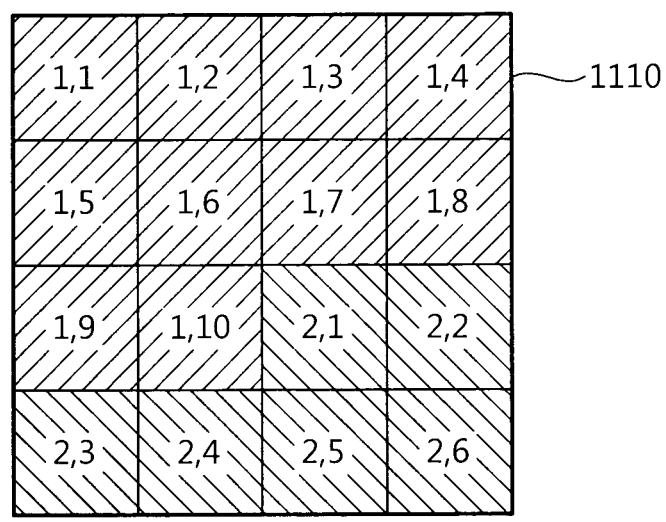

FIG. 11 is a diagram schematically illustrating another example of tiles and slices according to the invention. In the example illustrated in FIG. 11, a picture 1110 has a size 4×4 LCUs (coding tree blocks).

Referring to FIG. 11, the picture 1110 includes one tile and two slices, and the tile includes two complete slices. Therefore, the example illustrated in FIG. 11 does not violate the constraints according to the invention and thus is allowable.

FIG. 12 is a diagram schematically illustrating still another example of tiles and slices according to the invention. In the example illustrated in FIG. 12, a picture 1210 has a size 6×6 LCUs (coding tree blocks).

Referring to FIG. 12, the picture 1210 includes three tiles and three slices. In the example illustrated in FIG. 12, it may be said that each tile includes one slice and each slice includes one tile. Therefore, the example illustrated in FIG. 12 does not violate the constraints according to the invention and thus is allowable.

When a picture is partitioned into two or more tiles but include one slice, the constraints according to the invention can be satisfied.

FIG. 13 is a diagram schematically illustrating still another example of tiles and slices according to the invention. In the example illustrated in FIG. 13, a picture 1310 has a size 6×6 LCUs (coding tree blocks).

Referring to FIG. 13, the picture 1310 includes three tiles and three slices. In the example illustrated in FIG. 13, it may be said that each tile includes one slice and each slice includes one tile. Therefore, the example illustrated in FIG. 13 does not violate the constraints according to the invention and thus is allowable.

FIG. 14 is a diagram schematically illustrating still another example of tiles and slices according to the invention. In the example illustrated in FIG. 14, a picture 1410 has a size 4×4 LCUs (coding tree blocks).

Referring to FIG. 14, the picture 1410 includes two tiles and one slice. In the example illustrated in FIG. 14, the slice includes two complete tiles. Therefore, the example illustrated in FIG. 14 does not violate the constraints according to the invention and thus is allowable.

FIG. 15 is a diagram schematically illustrating still another example of tiles and slices according to the invention. In the example illustrated in FIG. 15, a picture 1510 has a size 4×4 LCUs (coding tree blocks).

Referring to FIG. 15, the picture 1510 includes two tiles and one slice. In the example illustrated in FIG. 15, the slice includes two complete tiles. Therefore, the example illustrated in FIG. 15 does not violate the constraints according to the invention and thus is allowable.

FIG. 16 is a diagram schematically illustrating still another example of tiles and slices according to the invention. In the example illustrated in FIG. 16, a picture 1610 has a size 6×6 LCUs (coding tree blocks).

Referring to FIG. 16, the picture 1610 includes three tiles and one slice. In the example illustrated in FIG. 16, the slice includes three complete tiles. Therefore, the example illustrated in FIG. 16 does not violate the constraints according to the invention and thus is allowable.

Figure 17:
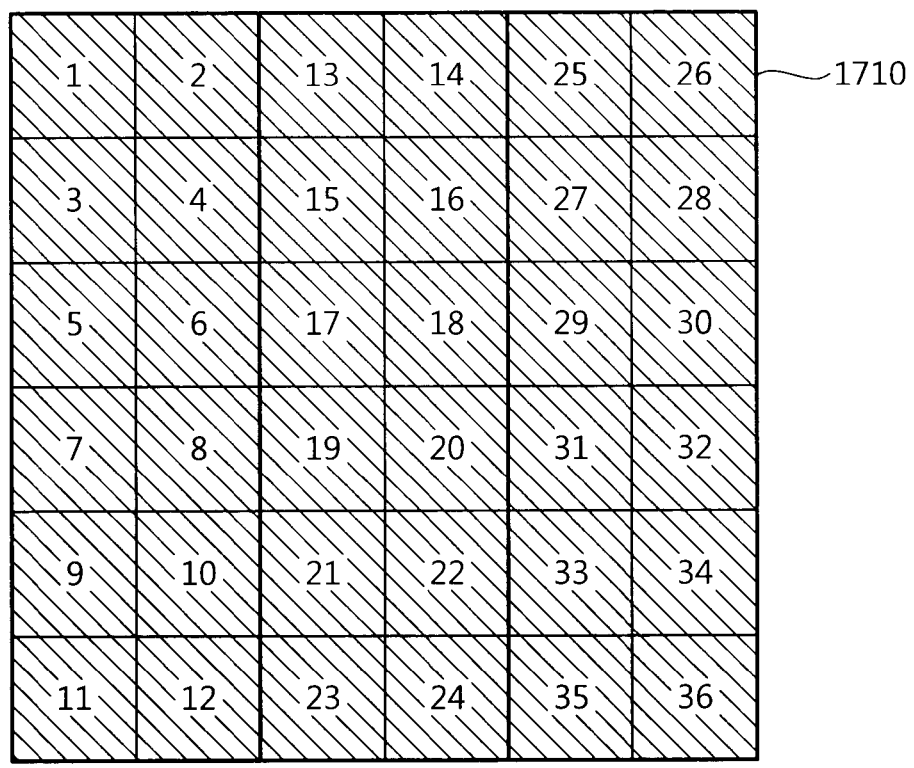

FIG. 17 is a diagram schematically illustrating still another example of tiles and slices according to the invention. In the example illustrated in FIG. 17, a picture 1710 has a size 6×6 LCUs (coding tree blocks).

Referring to FIG. 17, the picture 1710 includes three tiles and one slice. In the example illustrated in FIG. 17, the slice includes three complete tiles. Therefore, the example illustrated in FIG. 17 does not violate the constraints according to the invention and thus is allowable.

Even when one picture is partitioned into two or more tiles and each tile includes one slice, the constraints according to the invention can be satisfied.

Figure 18:
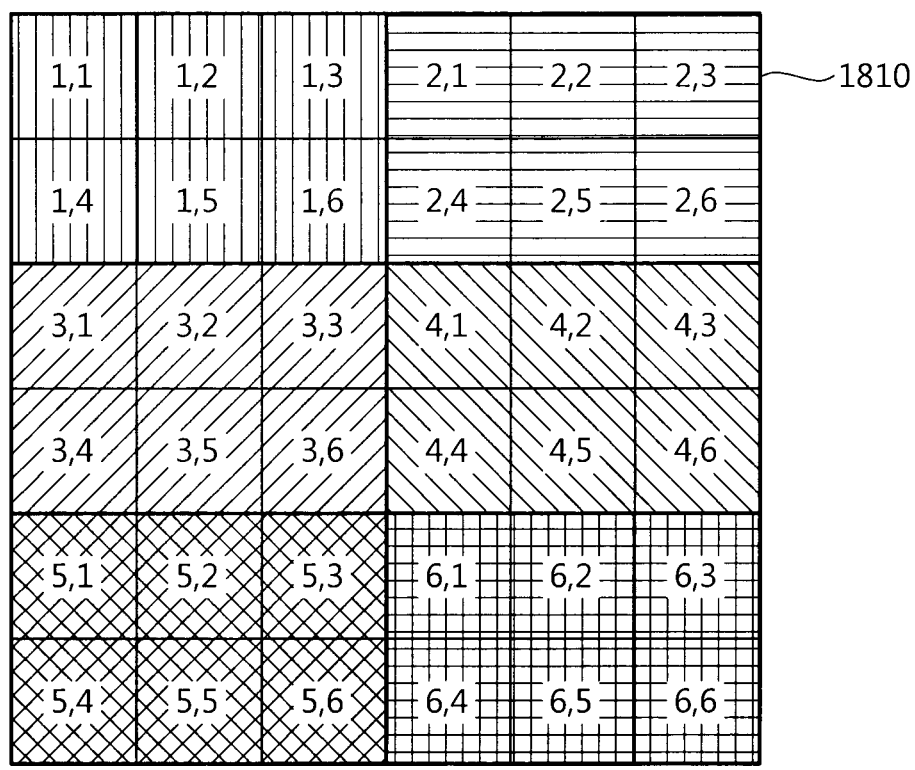

FIG. 18 is a diagram schematically illustrating an example of tiles and slices according to the invention. In the example illustrated in FIG. 18, a picture 1810 has a size 6×6 LCUs (coding tree blocks).

Referring to FIG. 18, the picture 1810 includes six tiles and six slices. In the example illustrated in FIG. 18, it may be said that each slice includes one tile and each tile includes one slice. Therefore, the example illustrated in FIG. 18 does not violate the constraints according to the invention and thus is allowable.

Figure 19:
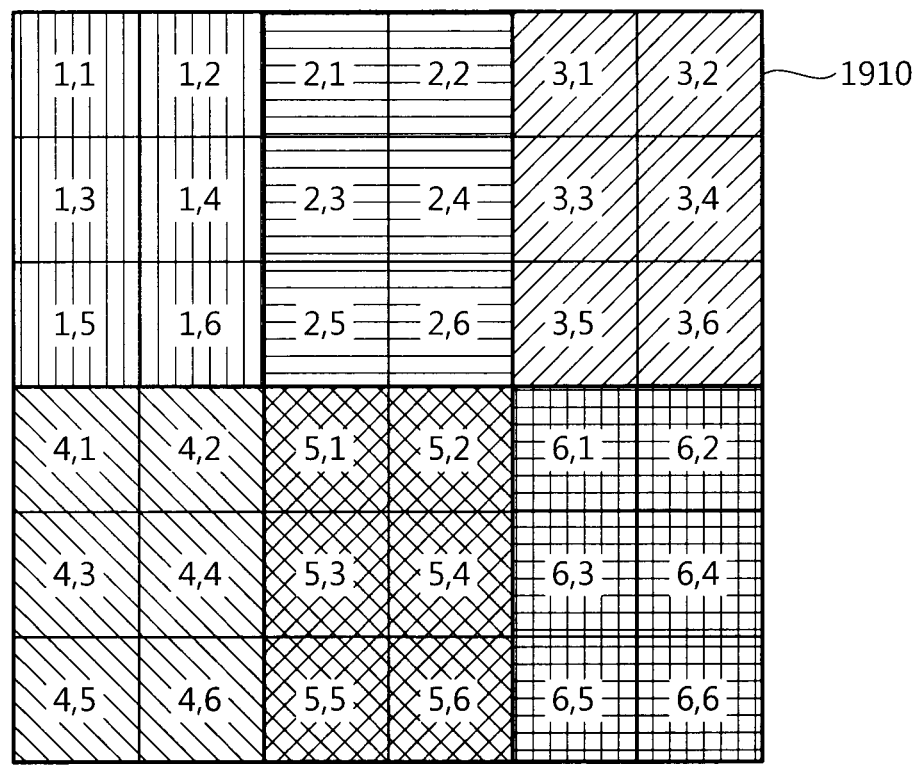

FIG. 19 is a diagram schematically illustrating an example of tiles and slices according to the invention. In the example illustrated in FIG. 19, a picture 1910 has a size 6×6 LCUs (coding tree blocks).

Referring to FIG. 19, the picture 1910 includes six tiles and six slices. In the example illustrated in FIG. 19, it may be said that each slice includes one tile and each tile includes one slice. Therefore, the example illustrated in FIG. 19 does not violate the constraints according to the invention and thus is allowable.

Even when one picture is partitioned into multiple slices and multiple tiles and each slice includes one or more tiles, the constraints according to the invention can be satisfied.

Figure 20:
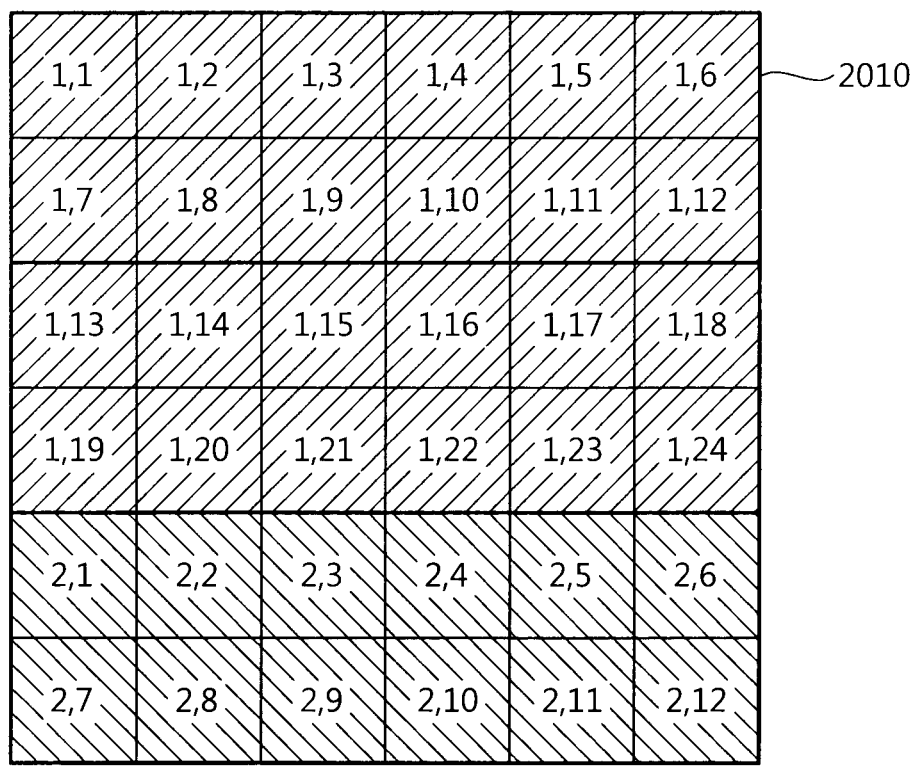

FIG. 20 is a diagram schematically illustrating an example of tiles and slices according to the invention. In the example illustrated in FIG. 20, a picture 2010 has a size 6×6 LCUs (coding tree blocks).

Referring to FIG. 20, the picture 2010 includes three tiles and two slices. In the example illustrated in FIG. 20, it may be said that the first slice includes two tiles and the second slice includes one tile. Therefore, the example illustrated in FIG. 20 does not violate the constraints according to the invention and thus is allowable.

Examples where the constraints according to the invention are not satisfied will be described below with reference to the accompanying drawings.

FIG. 21 is a diagram schematically illustrating an example of slices and tiles which are not allowable because the constraints according to the invention are not satisfied. In the example illustrated in FIG. 21, a picture 2110 has a size of 4×4 LCUs (coding tree blocks).

Referring to FIG. 21, the picture 2110 includes two tiles and two slices.

From the viewpoint that a tile includes a slice, the first tile (upper tile) includes one complete slice and a part of a slice and the second tile (lower tile) includes a part of the slice.

From the viewpoint that a slice includes a tile, the first slice includes one complete tile and a part of a tile and the second slice includes a part of the tile.

Therefore, the example illustrated in FIG. 21 violates (2) a natural number of complete slices has to be present in a tile when the tile includes slices and (3) a natural number of complete tiles has to be present in a slice when the slice includes tiles out of the above-mentioned constraints on slices and tiles according to the invention, and thus is not allowable.

Figure 22:
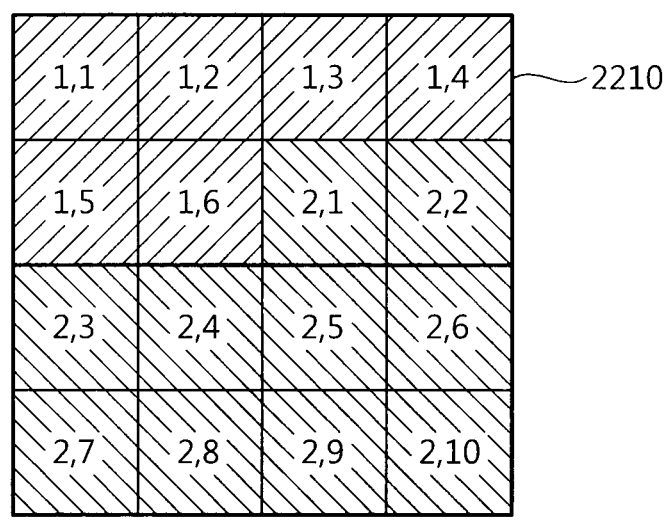

FIG. 22 is a diagram schematically illustrating another example of slices and tiles which are not allowable because the constraints according to the invention are not satisfied. In the example illustrated in FIG. 22, a picture 2210 has a size of 4×4 LCUs (coding tree blocks).

Referring to FIG. 22, the picture 2210 includes two tiles and two slices.

From the viewpoint that a tile includes a slice, the first tile (upper tile) includes a part of a slice instead of one complete slice and the second tile (lower tile) includes one complete slice and a part of a slice.

From the viewpoint that a slice includes a tile, the first slice includes a part of a tile instead of one complete tile and the second slice includes one complete tile and a part of a tile.

Therefore, the example illustrated in FIG. 22 violates (2) a natural number of complete slices has to be present in a tile when the tile includes slices and (3) a natural number of complete tiles has to be present in a slice when the slice includes tiles out of the above-mentioned constraints on slices and tiles according to the invention, and thus is not allowable.

Figure 23:
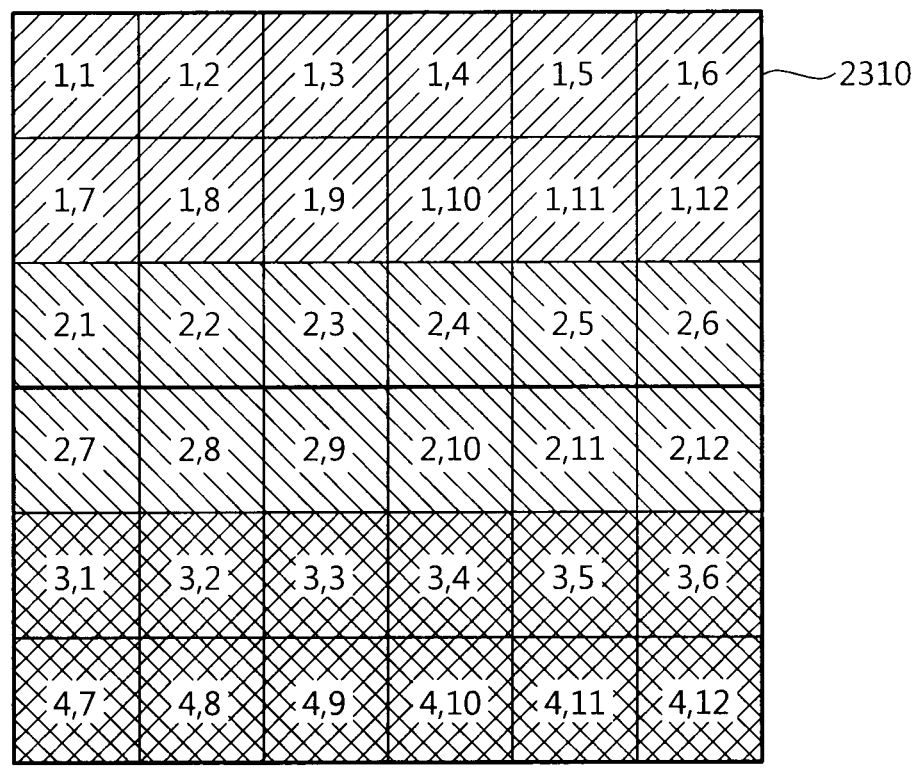

FIG. 23 is a diagram schematically illustrating still another example of slices and tiles which are not allowable because the constraints according to the invention are not satisfied. In the example illustrated in FIG. 23, a picture 2310 has a size of 6×6 LCUs (coding tree blocks).

Referring to FIG. 23, the picture 2310 includes two tiles and three slices.

From the viewpoint that a tile includes a slice, the first tile (upper tile) includes one complete slice and a part of a slice instead of two complete slices and the second tile (lower tile) includes one complete slice and a part of a slice. The second slices traverse two tiles instead of one tile.

From the viewpoint that a slice includes a tile, each of three slices includes a part of a tile instead of one complete tile.

Therefore, the example illustrated in FIG. 23 violates (2) a natural number of complete slices has to be present in a tile when the tile includes slices and (3) a natural number of complete tiles has to be present in a slice when the slice includes tiles out of the above-mentioned constraints on slices and tiles according to the invention, and thus is not allowable.

Figure 24:
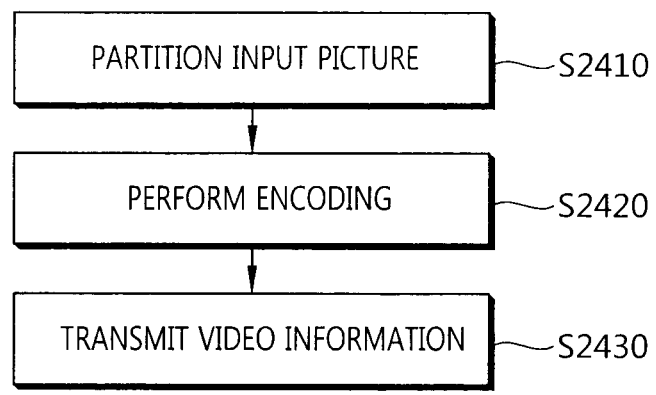
FIG. 24 is a flowchart schematically illustrating an encoding method according to the invention.

FIG. 24 is a flowchart schematically illustrating a video encoding method according to the invention.

Referring to FIG. 24, the video encoder may partition an input picture (S2410). The video encoder may partition the input picture to specify tiles and slices. A picture may be partitioned into one or more tiles and one or more slices, and constraints for parallel processing may be imposed on the tiles and the slices. When it is determined that NSQT or the AMP is used, the picture may be partitioned into non-square transform blocks or asymmetric prediction blocks.

For example, a tile in the input picture must not traverse a slice boundary, and a slice must not traverse a tile boundary.

A tile may include a natural number of complete slices when the tile includes slices, and a slice may include a natural number of complete tiles when the slice includes tiles.

The video encoder may perform an encoding process on the basis of the tiles and the slices (S2420). Since a picture can be partitioned into one or more tile and one or more slices and the constraints for parallel processing are imposed on the tiles and the slices, the video encoder may encode the tiles and/or slices in parallel through the use of the processing cores.

The video encoder may perform transform on the corresponding non-square block when the NSQT is used, and the video encoder may perform prediction on the corresponding asymmetric block.

The video encoder may transmit encoded video information (S 2430). At this time, the video information may include information on a slice and a tile specified on the basis of the constraints for the parallel process. In other words, the information on a tile and a slice included in the video information may be information on a tile and a slice specified on the basis of the constraints that a tile may include a natural number of complete slices when the tile includes slices and a slice may include a natural number of complete tiles when the slice includes tiles.

The video information may include information for constraining whether to use the NSQT and the AMP. For example, the video information may include information indicating whether to use the NSQT. The video information may include information indicating whether to use the AMP.

For the purpose of convenience of explanation, it is described above with reference to FIG. 24 that the video encoder performs the steps, but the invention is not constrained to this configuration. For example, step S2410 may be performed by the picture partitioning module 105 of FIG. 1, step S2420 may be performed by functional blocks other than the picture partitioning module 105 in FIG. 1, and step S2430 may be performed by a particular transmission module or the entropy encoding module 130. Here, the transmission module may not be separately provided, but may be included in the entropy encoding module 130.

Figure 25:
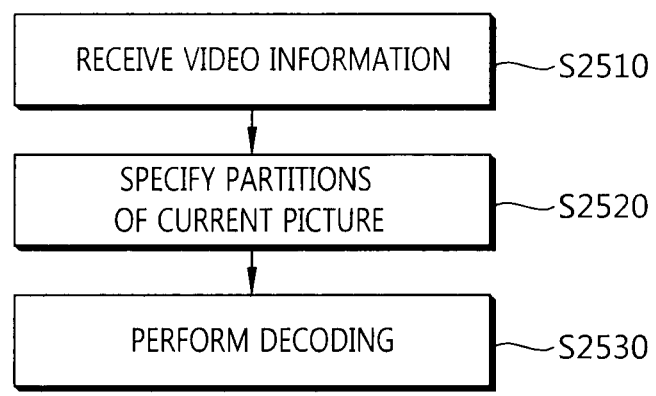
FIG. 25 is a flowchart schematically illustrating a decoding method according to the invention.

FIG. 25 is a flowchart schematically illustrating a video decoding method according to the invention.

Referring to FIG. 25, the video decoder may receive video information (S2510). The video decoder may receive video information transmitted from the video encoder and the video information may include information for specifying tiles and slices in a current picture.

The video information may include information for constraining whether to use the NSQT and the AMP. For example, the video information may include information indicating whether to use the NSQT. The video information may include information indicating whether to use the AMP.

The video decoder may specify partitions of the current picture on the basis of the received video information (S2520). The video decoder specifies the slices and the tiles in the current picture on the basis of the information for specifying the tiles and the slices, which is included in the video information. At this time, the current picture may be partitioned into one or more tiles and one or more slices, and constraints for parallel processing may be imposed on the tiles and the slices.

For example, in an input picture, a tile must not traverse a slice boundary, and a slice must not traverse a tile boundary.

A tile may include a natural number of complete slices when the tile includes slices, and a slice may include a natural number of complete tiles when the slice includes tiles.

When the video information indicates that the NSQT or the AMP is used, the picture may be partitioned into non-square transform blocks or asymmetric prediction blocks and then may be processed.

The video decoder may perform a decoding process on the basis of the specified tiles and slices (S2530). Since a picture can be partitioned into one or more tile and one or more slices and the constraints for parallel processing are imposed on the tiles and the slices, the video decoder may encode the tiles and/or slices in parallel through the use of the processing cores.

The video decoder may perform transform on the corresponding non-square block when the NSQT is used, and the video decoder may perform prediction on the corresponding asymmetric block.

Here, it is described above that the video decoder performs the steps of FIG. 25, but this is for the purpose of convenience of explanation and the invention is not limited to this configuration. For example, step S2510 may be performed by a particularly reception module or the entropy decoding module. The reception module may not be separately provided but may be included in the entropy decoding module. Step S2520 and step S2530 may be performed by the functional blocks of FIG. 2. For example, when modules performing the functions other than the reception function are referred to as a decoding module, steps S2520 and S2530 may be performed by the decoding module. When the entropy decoding module includes the reception module, step S2510 may be performed by the reception module in the decoding module.

While the methods in the above-mentioned exemplary system have been described on the basis of flowcharts including a series of steps or blocks, the invention is not limited to the order of steps and a certain step may be performed in a step or an order other than described above or at the same time as described above. The above-mentioned embodiments may include various examples. Therefore, the invention includes all substitutions, corrections, and modifications belonging to the appended claims.

The invention claimed is:

1. A video decoding method based on tiles and slices in a current picture by decoding apparatus, the method comprising:
   receiving video information including information on a tile which is a rectangular region comprising largest coding units and information on a slice which is a sequence of largest coding units;
   specifying a tile and a slice in a current picture on the basis of the received video information; and
   performing a decoding operation on the basis of the specified tile and the specified slice to reconstruct samples in the current picture,
   wherein a largest coding unit can be split into coding unit with quad-tree structure and the coding unit can be partitioned into prediction unit,
   wherein whether inter prediction is applied or intra prediction is applied is determined per each coding unit and mode of inter prediction and intra prediction is determined per each prediction unit,
   wherein the current picture is partitioned into one or more tiles and one or more slices,
   wherein each tile is decoded independently in other tiles and each slice is decoded independently in other slices, and
   wherein the tile is not configured to be across a boundary of the slice when the slice includes the tile and the slice is not configured to be across a boundary of the tile when the tile includes the slice.

2. The method of claim 1, wherein an integer number of complete tiles are present in a slice when the slice includes the tile.

3. The method of claim 1, wherein an integer number of complete slices are present in a tile when the tile includes the slice.

4. The method of claim 1, wherein a tile includes an integer number of complete slices when the tile includes the slice, and a slice includes an integer number of tiles when the slice includes the tile.

5. The method of claim 1, wherein the tile includes one or more slice, or the slice includes one or more tile.

6. The method of claim 5, wherein an integer number of complete slices are in the tile when the tile includes slices, and
   wherein an integer number of complete tiles are in the slice when the slice includes tiles.

7. The method of claim 5, wherein the slice is not included in two or more slices at the same time when the tile includes one or more slice, and
   wherein the tile is not included in two or more slices at the same time when the slice includes one or more tile.

8. The method of claim 1, wherein all of the largest coding units in the tile are included in a same slice.

9. The method of claim 1, wherein all of the largest coding units in the slice are included in a same tile.

* * * * *